US009524274B2

(12) United States Patent
Déjean

(10) Patent No.: US 9,524,274 B2
(45) Date of Patent: Dec. 20, 2016

(54) METHODS AND SYSTEMS FOR GENERATION OF DOCUMENT STRUCTURES BASED ON SEQUENTIAL CONSTRAINTS

(71) Applicant: Xerox Corporation, Norwalk, CT (US)

(72) Inventor: Hervé Déjean, Greoble (FR)

(73) Assignee: Xerox Corporation, Norwalk, CT (US)

( * ) Notice: Subject to any disclaimer, the term of this patent is extended or adjusted under 35 U.S.C. 154(b) by 465 days.

(21) Appl. No.: 13/911,452

(22) Filed: Jun. 6, 2013

(65) Prior Publication Data

US 2014/0365872 A1    Dec. 11, 2014

(51) Int. Cl.
| | | |
|---|---|---|
| G06F 17/00 | (2006.01) | |
| G06F 17/21 | (2006.01) | |
| G06K 9/62 | (2006.01) | |
| G06K 9/72 | (2006.01) | |
| G06F 17/22 | (2006.01) | |
| G06K 9/00 | (2006.01) | |

(52) U.S. Cl.
CPC ............ *G06F 17/217* (2013.01); *G06F 17/212* (2013.01); *G06F 17/2288* (2013.01); *G06K 9/00463* (2013.01); *G06K 9/6219* (2013.01); *G06K 9/723* (2013.01); *G06K 2209/01* (2013.01)

(58) Field of Classification Search
IPC ..................................................... G06F 17/212
See application file for complete search history.

(56) References Cited

U.S. PATENT DOCUMENTS

| | | | |
|---|---|---|---|
| 7,428,700 B2 * | 9/2008 | Wen ..................... | G06F 17/218 |
| | | | 707/E17.093 |
| 7,937,653 B2 | 5/2011 | Dejean et al. | |
| 8,090,724 B1 | 1/2012 | Welch et al. | |
| 2002/0107735 A1 * | 8/2002 | Henkin et al. ................ | 705/14 |
| 2003/0078899 A1 * | 4/2003 | Shanahan ...................... | 706/8 |
| 2005/0177586 A1 * | 8/2005 | Chen ................ | G06F 17/30905 |
| 2011/0145701 A1 | 6/2011 | Dejean et al. | |
| 2012/0079370 A1 | 3/2012 | Dejean | |
| 2012/0317470 A1 * | 12/2012 | Dejean ......................... | 715/227 |
| 2013/0114914 A1 | 5/2013 | Dejean | |

OTHER PUBLICATIONS

Mao et al., "Document Structure Analysis Algorithms: A Literature Survey", SPIE vol. 5010, Jan. 1, 2003, pp. 197-207.
Brugger et al., "A DTD Extension for Document Structure Recognition", Informatics Institute of the University of Fribourg, Chemin du Musee 3, CH-1700 Fribourg, Switzerland, Jan. 1, 1988, pp. 343-354.

(Continued)

*Primary Examiner* — Scott Baderman
*Assistant Examiner* — Steven Golden
(74) *Attorney, Agent, or Firm* — Fay Sharpe LLP

(57) ABSTRACT

Disclosed is a method that structures a sequentially-ordered set of elements, each being characterized by a set of features. N-grams (sequence of n features) are computed from a set for n contiguous elements, and n-grams which are repetitive (Kleene cross) are selected. Elements matching the most frequent repetitive n-gram are grouped together under a new node, and a new sequence is created. The method is iteratively applied to this new sequence. The output is an ordered set of trees.

10 Claims, 6 Drawing Sheets

(56) References Cited

OTHER PUBLICATIONS

European Search Report for Application No. EP 14 17 1115, The Hague, Completed Mar. 20, 2015, 7 pages.
U.S. Appl. No. 13/530,141, filed Jun. 22, 2012, Dejean.
A prototype document image analysis system for technical journals, computer, 7(25): 10-22, 1992.
IBM Journal of Research and Development, 26(6): 647-656, 1982.
Galle, Compact Hierarchical Structures in DNA by Means of the Smallest Grammar Problem, Feb. 15, 2011, 143 pages, Universite de Rennes 1.

* cited by examiner

FIG. 1

METHODS AND SYSTEMS FOR GENERATION OF DOCUMENT STRUCTURES BASED ON SEQUENTIAL CONSTRAINTS

BACKGROUND

The exemplary embodiments relate to document processing and find particular application in connection with a method and system for generation of document structures associated with a document page.

While the use of electronically created and recorded documents is prevalent, many such electronic documents are in a form that does not permit them to be used other than for viewing or printing. To provide greater accessibility to the content of such documents, it is desirable to understand their structure. However, when electronic documents are recovered by scanning a hardcopy representation or by recovering an electronic representation (e.g., PDF or Postscript representation), a loss of document structure usually results because the representation of the document is either at a very low level (e.g., bitmap) or an intermediate level (e.g., a document formatted in a page description language or a portable document format).

Geometric (or physical) page layout analysis can be used to recognize the different elements of a page, often in terms of text regions and image regions. Methods are known for determining a document's logical structure, or the order in which objects are laid out on a document image (i.e., layout objects). Such methods exploit the geometric or typographical features of document image objects, sometimes using of the content of objects and a priori knowledge of page layout for a particular document class. Geometric page layout analysis (GPLA) algorithms have been developed to recognize different elements of a page, often in terms of text blocks and image blocks. Examples of such algorithms include the X-Y Cut algorithm, described by Nagy, et al. (A prototype document image analysis system for technical journals. Computer, 7(25): 10-22, 1992) and the Smearing algorithm, described by Wong, et al. (Document analysis system. IBM Journal of Research and Development, 26(6): 647-656, 1982). These GPLA algorithms receive as input a page image and perform a segmentation based on information, such as pixel information, gathered from the page. These approaches to element recognition are either top-down or bottom-up and mainly aim to delimit boxes of text or images in a page. These methods are useful for segmenting pages one dimensionally, into columns.

Provided here is a method that structures a sequentially-ordered set of elements, each being characterized by a set of features. N-grams (sequence of n features) are computed from a set for n contiguous elements, and n-grams which are repetitive (Kleene cross) are selected. Elements matching the most frequent repetitive n-gram are grouped together under a new node, and a new sequence is created. The method is iteratively applied to this new sequence. The output is an ordered set of trees.

INCORPORATION BY REFERENCE

"COMPACT HIERARCHICAL STRUCTURES IN DNA BY MEANS OF THE SMALLEST GRAMMAR PROBLEM", by Matthias Gallé, dated Feb. 15, 2011, http://tel.archives-ouvertes.fr/docs/00/59/54/94/ANNEX/presentation.pdf, 143 pages, Université de Rennes 1;

U.S. patent application Ser. No. 13/288,109, filed, Nov. 3, 2011, by Herve Dejean, entitled "SIGNATURE MARK DETECTION";

U.S. patent application Ser. No. 13/530,141, filed Jun. 22, 2012, by Hervé Déjean, entitled "SYSTEM AND METHOD FOR IDENTIFYING REGULAR GEOMETRIC STRUCTURES IN DOCUMENT PAGES";

U.S. Patent Publication No. US 2011/0145701, published Jun. 16, 2011, by Déjean et al., entitled "METHOD AND APPARATUS FOR DETECTING PAGINATION CONSTRUCTS INCLUDING A HEADER AND A FOOTER IN LEGACY DOCUMENTS";

U.S. Patent Publication No. US 2012/0079370, published Mar. 29, 2012, by Déjean, entitled "SYSTEM AND METHOD FOR PAGE FRAME DETECTION";

U.S. Patent Publication No. US 2012/0317470, published Dec. 13, 2012, by Déjean, entitled "GENERATE-AND-TEST METHOD FOR COLUMN SEGMENTATION"; and U.S. Pat. No. 7,937,653, issued May 3, 2011, by Déjean et al., entitled "METHOD AND APPARATUS FOR DETECTING PAGINATION CONSTRUCTS INCLUDING A HEADER AND A FOOTER IN LEGACY DOCUMENTS", are all incorporated herein by reference in their entirety.

BRIEF DESCRIPTION

In one embodiment of this disclosure, described is a computer implemented method of hierarchically segmenting a sequence of elements associated with a digital version of a document comprising: a) obtaining a sequence of elements representing the document; b) defining a set of named features associated with each element of the sequence of elements, each named feature defined by a feature value type; c) computing a set of feature values associated with the set of named features for each element of the sequence; d) generating a set of n-grams from the sequence of elements, an n-gram including an ordered sequence of n features provided by a sequence of n named elements; e) electing sequential n-grams from the set of n-grams, the sequential n-grams defined as similar contiguous n-grams; f) selecting the most frequent sequential n-gram from the elected sequential n-grams; and g) generating a new sequence of the elements by matching the selected most frequent sequential n-gram against the sequence of elements associated with the document, replacing matched elements of the sequence of elements with a respective node, and associating the matched elements of the sequence of elements as children of the respective node.

In another embodiment of this disclosure, described is an image processing system comprising: a controller configured to receive a digital version of a document, the controller configured to execute instructions to perform a method of hierarchically segmenting a sequence of elements associated with the digital version of the document comprising: a) obtaining a sequence of elements representing the document; b) defining a set of named features associated with each element of the sequence of elements, each named feature defined by a feature value type; c) computing a set of feature values associated with the set of named features for each element of the sequence; d) generating a set of n-grams from the sequence of elements, an n-gram including an ordered sequence of n features provided by a sequence of n named elements; e) electing sequential n-grams from the set of n-grams, the sequential n-grams defined as similar contiguous n-grams; f) selecting the most frequent sequential n-gram from the elected sequential n-grams; and g) generating a new sequence of the elements by matching the selected most frequent sequential n-gram against the sequence of elements associated with the document, replacing matched elements of the sequence of elements with a respective node, and associating the matched elements of the sequence of elements as children of the respective node.

In still another embodiment of this disclosure, described is a computer program product comprising a non-transitory recording medium storing instructions, which when executed on a computer cause the computer to perform a method of hierarchically segmenting a sequence of elements associated with a digital version of a document comprising: a) obtaining a sequence of elements representing the document; b) defining a set of named features associated with each element of the sequence of elements, each named feature defined by a feature value type; c) computing a set of feature values associated with the set of named features for each element of the sequence; d) generating a set of n-grams from the sequence of elements, an n-gram including an ordered sequence of n features provided by a sequence of n named elements; e) electing sequential n-grams from the set of n-grams, the sequential n-grams defined as similar contiguous n-grams; f) selecting the most frequent sequential n-gram from the elected sequential n-grams; and g) generating a new sequence of the elements by matching the selected most frequent sequential n-gram against the sequence of elements associated with the document, replacing matched elements of the sequence of elements with a respective node, and associating the matched elements of the sequence of elements as children of the respective node.

BRIEF DESCRIPTION OF THE DRAWINGS

FIG. 1 is a view of a scanned page of a document.

DETAILED DESCRIPTION

Figure 2:
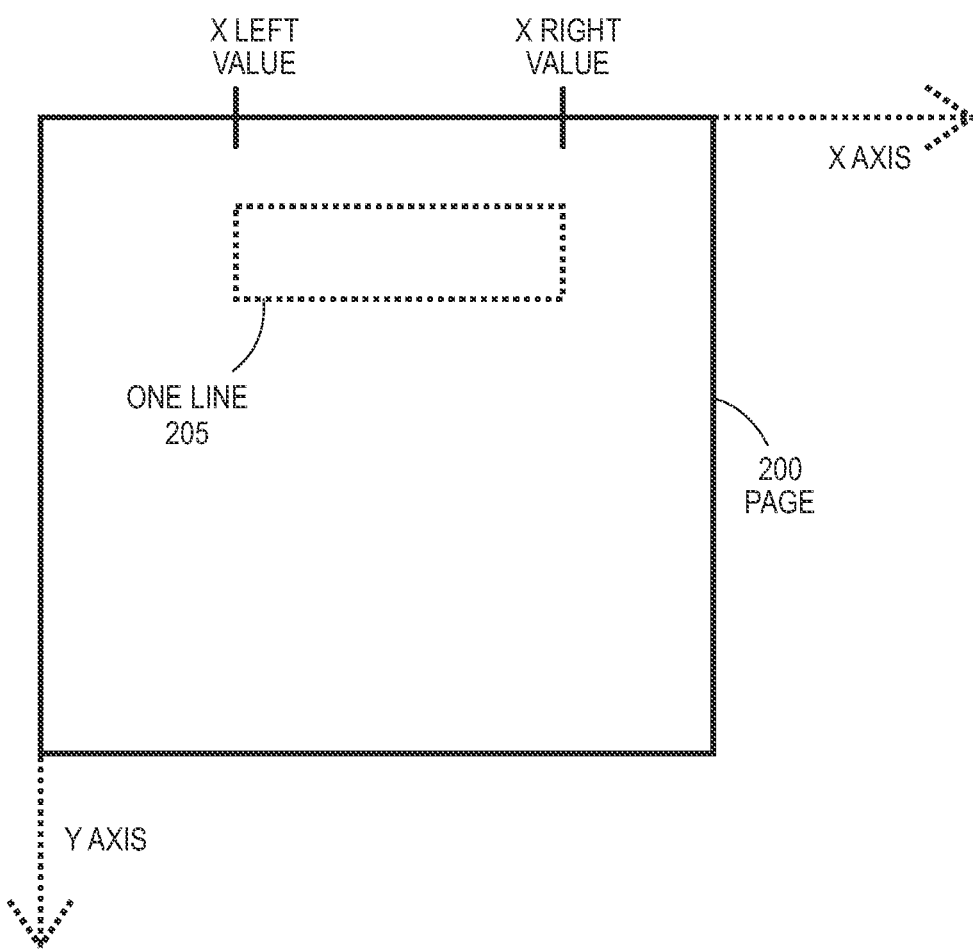
FIG. 2 is a schematic view of a page of a document including the features xleft and xright.

Provided herein is a method that structures a sequentially-ordered set of elements, each being characterized by a set of features. N-grams (sequence of n features) are computed from a set for n contiguous elements, and n-grams which are repetitive (Kleene cross) are selected. Elements matching the most frequent repetitive n-gram are grouped together under a new node, and a new sequence is created. The method is iteratively applied to this new sequence and the output is an ordered set of trees.

As additional background, an algorithm detecting regular geometrical structures is disclosed in U.S. patent application Ser. No. 13/530,141, filed Jun. 22, 2012 by Hervé Déjean and entitled "SYSTEM AND METHOD FOR IDENTIFYING REGULAR GEOMETRIC STRUCTURES IN DOCUMENT PAGES". In contrast, presented here is a method to detect sequential structures.

In a document, many objects are organized as an ordered sequence, or can be viewed as a sequence. For example, a book is a sequence of pages, a column is a sequence of lines, a chapter is a sequence of paragraphs, and a list is a sequence of items. Ordered sequential structures can then be viewed as core to a document structure. According to one exemplary method provided herein, sequential patterns are mined in a document, focusing on ordered repetitive contiguous patterns.

This disclosure provides, in part, a generic algorithm applicable to a wide range of document structuring problems. It essentially solves a form of grammar inference problem. Given an input sequence of elements, each described by a set of features, the algorithm outputs a regular expression to which the sequence "fuzzily" belongs. The algorithm detects repetitions of "n-grams" i.e. sequences of filters for the feature values, which apply to the subsequences of the input sequence. A number of heuristics are defined at each step of the algorithm.

Presented below is a description of exemplary methods including details of each step. Finally, discussed is how the disclosed method and system can be used in practice, as well as a document processing system which executes the methods described herein.

Input: an ordered sequence of elements.

Step 1) Elements characterization: features characterizing an element are computed.

Step 2) Features are calibrated: similar features are regrouped together to provide a normalization step to consider similar features as equal; kind of clustering.

Step 3) N-grams generation: a set of n-grams from 1 to N, N being a configurable parameter is generated for the sequence of elements.

Step 4) Sequential N-grams are selected and ordered by frequency.

Step 5) The most frequent n-gram is selected and sequences of elements matching this n-gram are structured by regrouping the elements and associating the regrouped elements with a single node.

Step 6) The identified sequences are enriched with additional n-grams.

Step 7) The method is applied iteratively over the new sequence of elements as long as step 4 can generate new n-grams.

Initially, provided below, is a description of a method of generating document structures based on sequential constraints and fuzzy matching. Notably, the method includes a calibration step and an enrichment step which may or not be included in alternative algorithms, as will later be described with reference to FIGS. 3-5.

Figure 1:
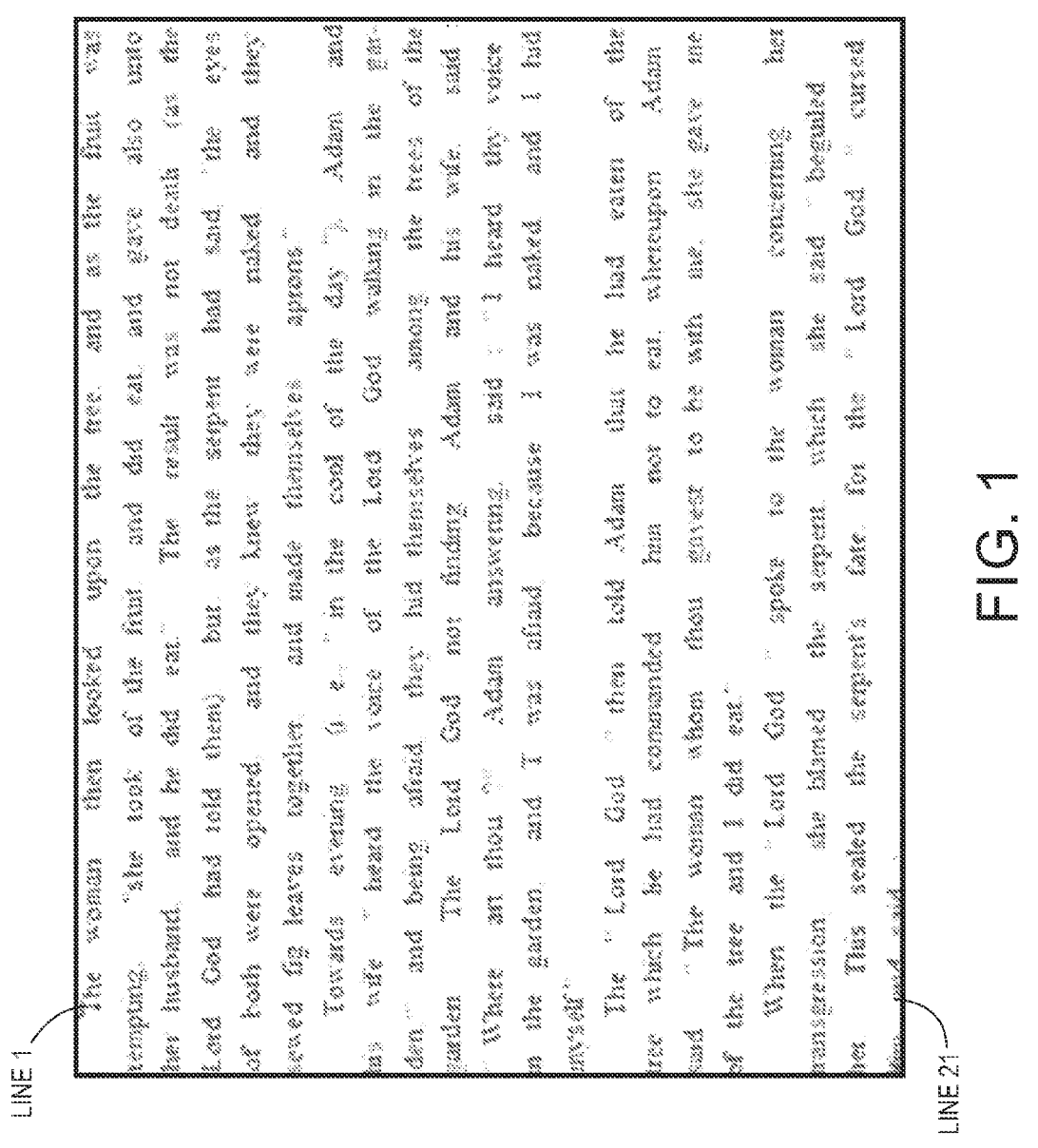

Now described is the method using a basic example: finding the indentation structure of a set of lines. The portion of text is shown in FIG. 1.

The input of the method is an ordered sequence of elements, such as pages, lines, blocks, words, columns, etc. The first step includes characterizing elements of the processed sequence with a set of features.

Characterizing Elements

Each element is associated with a set of features. Features are named and typed (numerical, text, . . . ). A distance has to be provided to cope with fuzzy matching. This distance aims at considering equal features that have almost similar values. To be equal, two features must be the same type and associated with a distance (difference between their values) below a given threshold, defined at the creation of the feature. This fuzzy-matching is especially useful for dealing with noise associated with OCR (Optical Character Recognition), or with some irregularities in the document. Hereafter, the term fuzzyequal is used to characterize two features of the same type whose values difference is less than the maximal distance for this feature type.

Table 1 is a list of feature types defined.

TABLE 1

| Feature Type | Value | Distance |
|---|---|---|
| NUMERICAL | A numerical value (real number) | Value difference |
| TEXT | Textual content | Edit distance for strings |
| POSITION | A pair (x, y) for real number | Euclidian distance |
| ZONE | X, y, height, width | Zone overlap |
| REGEX | Regular expression | Edit Distance-to the regular expression |

This example set of basic feature types allows for most components. Specific features, which may be more abstract, can be designed for specific structures.

Example

Taking the example provided by FIG. 1, a sequence is composed of 21 ordered lines. With reference to FIG. 2, each line 205 of the page 200 is characterized by two features: xleft (left-side vertical position in the page) and xright (right-side position in the page). Both have a NUMERICAL type. The distance threshold for each feature is 5 points (unit used for positioning; 1 pt=0.3 mm).

Shown below in Table 2 is the sequence of elements, i.e. sequence of 21 lines, and the associated features xleft and xright values.

TABLE 2

| Line | xleft | xright |
|---|---|---|
| 1 | 82 | 355 |
| 2 | 67 | 356 |
| 3 | 67 | 356 |
| 4 | 67 | 356 |
| 5 | 67 | 355 |
| 6 | 66 | 306 |
| 7 | 82 | 355 |
| 8 | 66 | 356 |
| 9 | 67 | 356 |
| 10 | 66 | 356 |
| 11 | 67 | 356 |
| 12 | 66 | 355 |
| 13 | 67 | 102 |
| 14 | 82 | 355 |
| 15 | 66 | 355 |
| 16 | 66 | 355 |
| 17 | 66 | 178 |
| 18 | 82 | 354 |
| 19 | 66 | 348 |
| 20 | 66 | 355 |
| 21 | 66 | 126 |

Feature Calibration.

Once all features for all objects have been computed, a calibration step is performed in order to cope with very noisy input, such as a scanned and OCR'd document, and allows for better detection of n-grams.

Many Clustering methods can be used. The following one is used for simplicity: All features with the same name are regrouped, and a frequency histogram of their value is computed. Then features being fuzzyequal are grouped together. The feature having the most frequent value is considered as canonical feature for the group. This canonical feature is used to build the n-grams.

Example

Generated Canonical Features

TABLE 3

| Line | Xleft value | Canonical value | Xright value | Canonical value |
|---|---|---|---|---|
| 1 | 82 | 82 | 355 | 355 |
| 2 | 67 | 66 | 356 | 355 |
| 3 | 67 | 66 | 356 | 355 |
| 4 | 67 | 66 | 356 | 355 |
| 5 | 67 | 66 | 355 | 355 |
| 6 | 66 | 66 | 306 | 306 |
| 7 | 82 | 82 | 355 | 355 |
| 8 | 66 | 66 | 356 | 355 |
| 9 | 67 | 66 | 356 | 355 |
| 10 | 66 | 66 | 356 | 355 |
| 11 | 67 | 66 | 356 | 355 |
| 12 | 66 | 66 | 355 | 355 |
| 13 | 67 | 66 | 102 | 102 |
| 14 | 82 | 82 | 355 | 355 |
| 15 | 66 | 66 | 355 | 355 |
| 16 | 66 | 66 | 355 | 355 |
| 17 | 66 | 66 | 178 | 178 |
| 18 | 82 | 82 | 354 | 355 |
| 19 | 66 | 66 | 348 | 355 |
| 20 | 66 | 66 | 355 | 355 |
| 21 | 66 | 66 | 126 | 126 |

N-Grams Generation.

Features n-grams are generated, n varying in [1, N], N being a parameter (in fact the main parameter of the method). An n-gram is composed of an ordered sequence of n features provided by a sequence of n elements. For a sequence S of n elements, all combinations of n (n between 1 and N) features are generated (Cartesian product).

For example, from the following example sequence: [f1,f2]; [f3,f2]; [f1,f4]; [f2;f3].

The (incomplete) set of generated n-grams is:

1-gram: (f1); (f2); (f3); (f4).
2-gram: (f1,f3), (f1,f2); (f2,f3); (f2,f2); (f3,f1); (f3,f4); (f2,f1); (f2,f4); (f4,f2); (f4,f3).
3-gram: (f1,f3,f1); (f1,f3,f4); (f1,f2,f1); (f1,f2,f4); . . . .

For each n-gram a test is performed to assess its sequentiality: considering each sequence covered by a given n-gram, and how frequent this sequence is immediately followed by a sequence covered by the same n-gram. If this frequency is higher than a given threshold (implemented: 0.5*frequency (n-gram)), then the n-gram is considered as sequential.

Sequential n-grams are sorted by their frequency (number of elements an n-gram covers) in decreasing order. (It is assumed the most frequent n-grams are the less noisy ones.)

Example

Using the example, here is an excerpt of the n-grams generated, (maximal n-gram length N=4).

TABLE 4

| N-gram | Frequency |
|---|---|
| (XLEFT = 66.0) | 17 |
| (XRIGHT = 355.0) | 16 |
| (XRIGHT = 355.0) (XLEFT = 66.0) | 13 |
| (XLEFT = 66.0) (XLEFT = 66.0) | 12 |
| (XRIGHT = 355.0) (XLEFT = 66.0) | 12 |
| (XRIGHT = 355.0) (XLEFT = 66.0) (XRIGHT = 355.0) | 12 |
| (XRIGHT = 355.0) (XLEFT = 66.0) (XRIGHT = 355.0) (XLEFT = 66.0) | 12 |
| (XLEFT = 66.0) (XRIGHT = 355.0) | 12 |
| (XLEFT = 66.0) (XRIGHT = −355.0) (XLEFt = 66.0) | 12 |
| (XRIGHT = 355.0) (XRIGHT = 355.0) | 11 |
| (XRIGHT = 355.0) (XRIGHT = 355.0) (XLEFT = 66.0) | 11 |
| ... | |
| (XLEFT = 66.0) (XRIGHT = 355.0) (XRIGHT = 355.0) (XRIGHT = 355.0) | 5 |

Sequence Structuring.

Starting with the most frequent sequential n-gram, the sequence of elements is structured as follows (steps are illustrated below):

The word "sequence" refers to the complete sequence of elements, unless otherwise stated.

Each step of the sequence structure generation is illustrated below using the example provided in FIG. 1.

(a) Matching: The selected n-gram is used to structure the current sequence of elements. Initially, all sub-sequences of n contiguous elements which are matched by the n-gram are detected. An n-gram element matches a sub-sequence of n elements if each ith feature of the n-gram is included in the set of features of the ith element of the sub-sequence. Then, a key generalization criterion is applied to structure the sequence: based on the sequential property of the n-gram, consecutive sub-sequences are grouped together. The set of resulting sequences is referred to as SeqOfMatchingSeq, for example.

Missing elements, where one feature of the n-gram is not found in the n elements currently considered are allowed during the matching step in an n-gram, where n>1. For the example provided, the number of missing elements is set up to 1.

(b) Enrichment: The found sub-sequences of SeqOfMatchingSeq are enriched with new n-grams. The n-grams generation step is applied for each sub sequence. Sequential n-grams covering the current sub-sequence are added where the frequency of the added n-grams must be greater than a given threshold. According to the example provided, half of the sub-sequence length is the default threshold.

(c) Structuring: The sub-sequences of SeqOfMatchingSeq are structured as follows:

Each sub-sequence of contiguous matched elements is replaced by a new node. The new node is associated as featuring the n-gram with the added information that the feature is sequential. Elements of the sequence are added as children of the new node, where a new father is added to the elements of each sub-sequence, and added to this node the selected n-gram.

The new structured sequence is then considered as the current sequence. No distinction is made between newly added nodes and initial elements. Notably, all have at least a feature.

(d) Iteration: The method is iteratively applied to the new sequence from step (a) as long as step (a) can generate sequential n-grams.

Example (a) Matching: As shown in Table 5 below, the selected feature is LX=66.0, most frequent sequential n-gram. All elements fuzzymatching this n-gram are found, and consecutive elements are grouped together into sub-sequences. SeqOfMatchingSeq is then composed of 4 sub-sequences.

TABLE 5

| Line | xleft (canonical values used) | xright (canonical values used) | Matched sequences (SeqOfMatchingSeq) |
|---|---|---|---|
| 1 | 82 | 355 | |
| 2 | 66 | 356 | [X sub-sequence 1 |
| 3 | 66 | 356 | X |
| 4 | 66 | 356 | X |
| 5 | 66 | 355 | X |
| 6 | 66 | 306 | X] |
| 7 | 82 | 355 | |
| 8 | 66 | 356 | [X sub-sequence 2 |
| 9 | 66 | 356 | X |
| 10 | 66 | 356 | X |
| 11 | 66 | 356 | X |
| 12 | 66 | 355 | X |
| 13 | 66 | 102 | X] |
| 14 | 82 | 355 | |
| 15 | 66 | 355 | [X sub-sequence 3 |
| 16 | 66 | 355 | X |
| 17 | 66 | 178 | X] |
| 18 | 82 | 354 | |
| 19 | 66 | 348 | [X sub-sequence 1 |
| 20 | 66 | 355 | X |
| 21 | 66 | 126 | X] |

(b) Enrichment: As shown in Table 6 below, each sequence is enriched with new features which are frequent enough in the sub-sequences.

TABLE 6

| Line | xleft | xright | Matched sequences (SeqOfMatchingSeq) | Enriched n-grams |
|---|---|---|---|---|
| 1 | 82 | 355 | | |
| 2 | 66 | 355 | [X | xright-355 |
| 3 | 66 | 355 | X | xright-355 |
| 4 | 66 | 355 | X | xright-355 |
| 5 | 66 | 355 | X | xright-355 |
| 6 | 66 | 306 | X] | |
| 7 | 82 | 355 | | |
| 8 | 66 | 355 | [X | xright-355 |
| 9 | 66 | 355 | X | xright-355 |
| 10 | 66 | 355 | X | xright-355 |
| 11 | 66 | 355 | X | xright-355 |
| 12 | 66 | 355 | X | xright-355 |
| 13 | 66 | 102 | X] | |
| 14 | 82 | 355 | | |
| 15 | 66 | 355 | [X | xright-355 |
| 16 | 66 | 355 | X | xright-355 |
| 17 | 66 | 178 | X] | |
| 18 | 82 | 355 | | |
| 19 | 66 | 355 | [X | xright-355 |
| 20 | 66 | 355 | X | xright-355 |
| 21 | 66 | 126 | X] | |

(c) Structuring: Table 7 below shows the new sequence after matched sequences have been replaced by a new node. The '+' (Kleene cross) added to some features indicates that the feature is sequential. Notably, xleft=82 is not sequential. The new sequence is composed of normal elements and nodes.

TABLE 7

| Elements (Nx means new node) | features |
|---|---|
| 1 | xleft = 82; xright = 355 |
| N1 | (xleft = 66)+ |

TABLE 7-continued

| Elements (Nx means new node) | features |
|---|---|
| 7 | xleft = 82; xright = 355 |
| N2 | (xleft = 66)+ |
| 14 | xleft = 82; xright-355 |
| N3 | (xleft = 66)+ |
| 18 | xleft-82; xright = 355 |
| N4 | (xleft = 66)+ |

(d) Iteration: Steps a)-c) are performed over the new sequence.

a. The next selected n-gram is a bi-gram: (LX=82.0); (LX=66.0)+. This pattern matches one line with xleft=82 followed by a sequence of lines with xleft=66.

b. The enrichment step does not add any features.

c. The final sequence is structured as shown below in Table 8:

TABLE 8

| Elements | Feature |
|---|---|
| N5 | (xleft = 82; (xleft = 66)+)+ | d. Recursion: no n-gram generated: Only one node is available with an n-gram which was already processed. End of recursion The final structure is represented in Table 9 below. It corresponds to one single tree, which means that all elements are captured by a single structure indicating a kind of perfect regular structure. Notably, not all levels of the structure correspond to meaningful objects of the document, and they are not required to correspond to meaningful objects. The levels of the generated structure correspond to syntactic objects.

The final structure illustrated in Table 9 reflects a paragraph segmentation and identifies indentation values corresponding to a normal line (xleft=66), and the indented first paragraph line (xleft=82). If the method output can be used here as a structuring method, in real cases, it is used in order to identify key features-value pairs of a document object: key indentation elements of paragraphs are no longer identified by frequency, but through the final structure. A significant benefit of the sequence-based method disclosed herein is that even infrequent features can be recognized as significant if they are part of a structure.

The purpose of the disclosed method is not to directly build meaningful structures of a document, even if in some cases it does, but to detect significant features based on the generation of repetitive patterns. The output structure generated by the method corresponds to a syntactic structure generated by the algorithm. The generated structures allow for identifying key features-value pairs (characteristics) of document objects. This generated structure provides an alternative to simple frequency histograms in order to select key elements. The identification is based on the presence of features in a structure, and does not depend on its frequency.

As an example, consider a set of page frames, the content laid out rectangularly, used in a 600 page book. Most of the pages use a given page frame. However, the first page of a chapter has a page frame which is different from the given page frame. If there are 30 chapters in the book, the first chapter page frame represents only 5% of the page, which is a low threshold which also captures noisy elements. Using the sequence-based method disclosed herein instead of a frequency-based method allows detecting the first-chapter page frame.

While the above description of an exemplary embodiment of a method of hierarchically segmenting a sequence of elements associated with a document includes the step(s) of calibration and enrichment, it is to be understood this disclosure is not limited to embodiments which include these steps.

TABLE 9

| toplevel | Level 1 | Level 2 | Level 3 | Level 4 |
|---|---|---|---|---|
| (xleft = 82; (xleft = 66)+)+ | | | | |
| | xleft = 82; (xleft = 66)+ | | | |
| | | xleft = 82 | 1 | |
| | | | xleft = 66 | 2 |
| | | | xleft = 66 | 3 |
| | | | xleft = 66 | 4 |
| | | | xleft = 66 | 5 |
| | | | xleft = 66 | 6 |
| | xleft = 82; (xleft = 66)+ | xleft = 82 | 7 | |
| | | (xleft = 66)+ | xleft = 66 | 9 |
| | | | xleft = 66 | 10 |
| | | | xleft = 66 | 11 |
| | | | xleft = 66 | 12 |
| | | | xleft = 66 | 13 |
| | xleft = 82; (xleft = 66)+ | | | |
| | | xleft = 82 | 14 | |
| | | (xleft = 66)+ | xleft = 66 | 15 |
| | | | xleft = 66 | 16 |
| | | | xleft = 66 | 17 |
| | xleft = 82; (xleft = 66)+ | | | |
| | | xleft = 82 | 18 | |
| | | (xleft = 66)+ | xleft = 66 | 19 |
| | | | xleft = 66 | 20 |
| | | | xleft = 66 | 21 |

Figure 3:
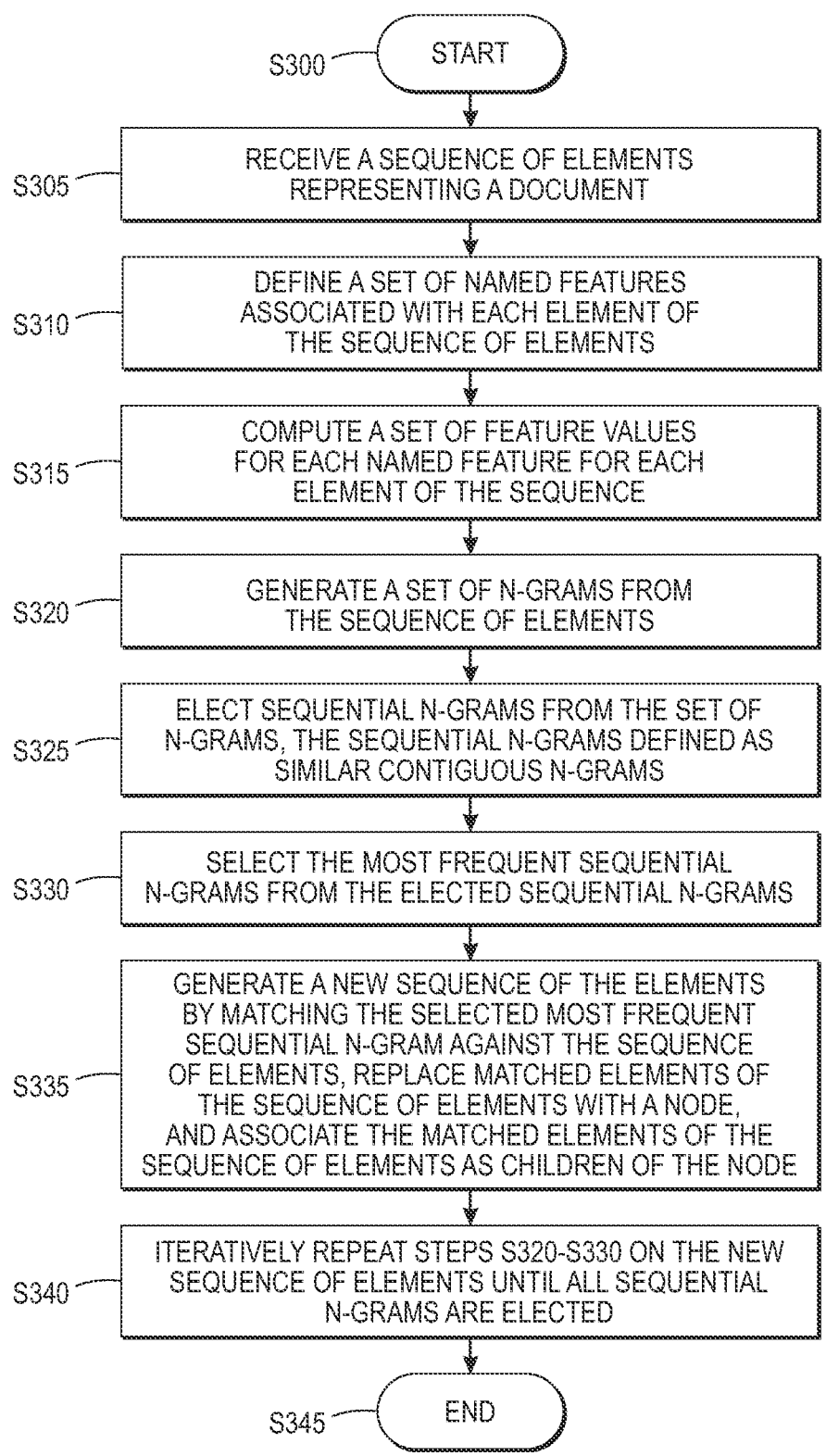
FIG. 3 is a flow chart of an exemplary method of segmenting a sequence of elements associated with a digital version of a document.
Figure 4:
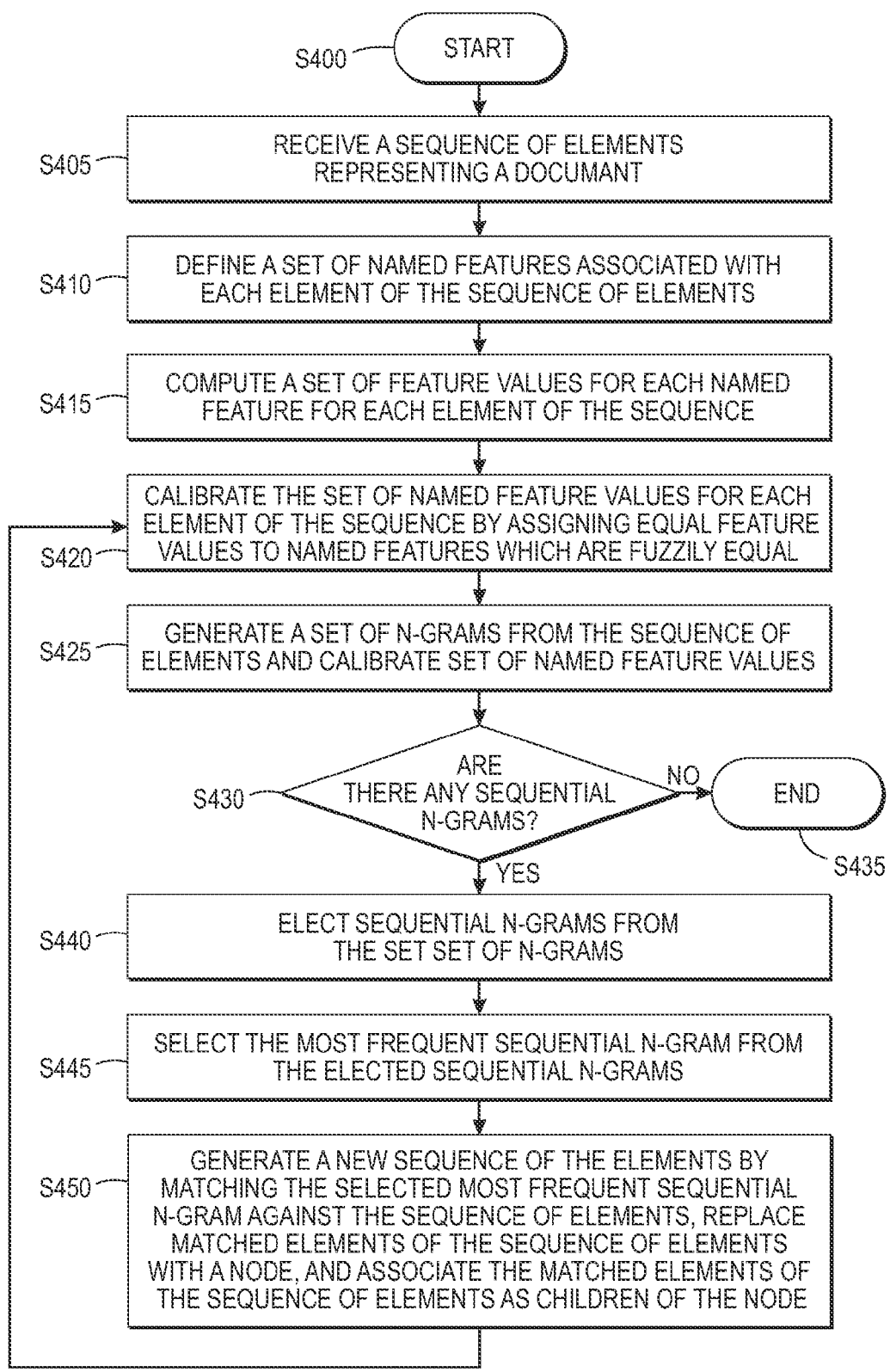
FIG. 4 is a flow chart of an exemplary method of segmenting a sequence of elements associated with a digital version of a document, the method including a calibration step which assigns equal feature valves to named features which are fuzzily equal.
Figure 5:
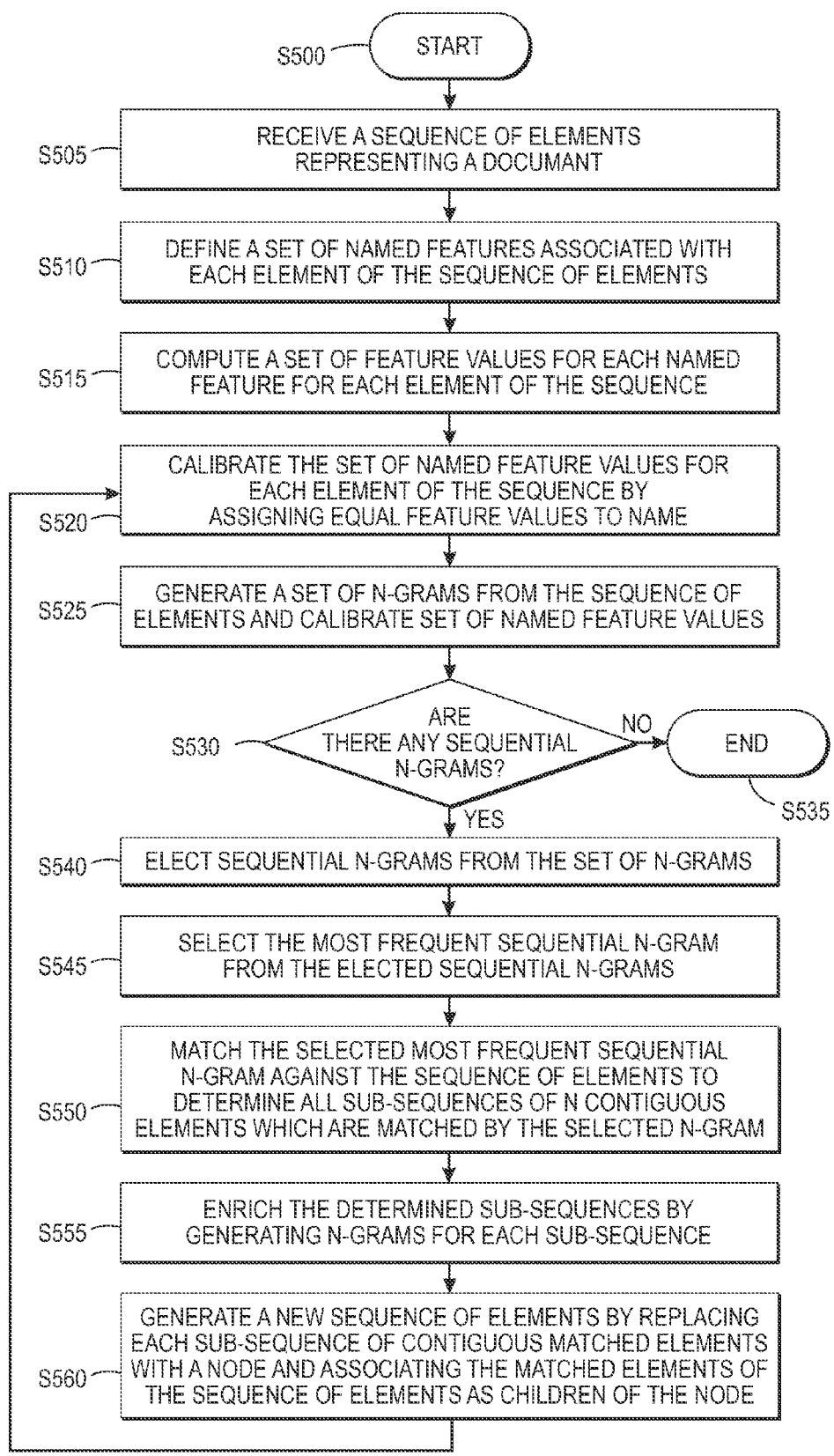
FIG. 5 is a flow chart of an exemplary method of segmenting a sequence of elements associated with a digital version of a document, the method including a calibration step which assigns equal feature values to named features which are fuzzily equal and an enrichment step which includes the generation of n-grams for one or more subsequences of elements.

With reference to FIGS. 3-5, illustrated and described below are a generic document structuring algorithm in FIG. 3; a document structuring algorithm including a calibration step in FIG. 4; and a document structuring algorithm including a calibration step and enrichment of determined sub-sequences in FIG. 5.

With reference to FIG. 3, illustrated is a generic flow chart of a method of segmenting a sequence of elements associated with a digital version of a document.

At S300, the process starts.

Then, at S305, the process receives a sequence of elements representing a document and step S310 defines a set of named features associated with each element of the sequence of elements.

Next, step S315 computes a set of feature values for each named feature for each element of the sequence.

Next, step S320 generates a set of n-grams from the sequence of elements.

Next, step S325 selects sequential n-grams from the set of n-grams, the sequential n-grams defined as similar contiguous n-grams.

Next, step S330 selects the most frequent sequential n-gram from the elected sequential n-grams.

Next, step S335 generates a new sequence of the elements by matching the selected most frequent sequential n-gram against the sequence of elements, replacing matched elements of the sequence of elements with a node, and associating the matched elements of the sequence of elements as children of the node.

Next, step S340 iteratively repeats steps S320-S330 on the new sequence of elements until all sequential n-grams are elected.

Finally, at S345, the process ends.

With reference to FIG. 4, illustrated is a flow chart of another method of segmenting a sequence of elements associated with a document, the method including a calibration step.

At step S400, the process starts.

Then, at step S405, the process receives a sequence of elements representing a document.

Next, at step S410, the process defines a set of named features associated with each element of the sequence of elements.

Next, at step S415, the process computes a set of feature values for each named feature for each element of the sequence.

Next, at step S420, the process calibrates the set of named feature values for each element of the sequence by assigning equal feature values to named features which are fuzzily equal.

Next, at step S425, the process generates a set of n-grams from the sequence of elements and calibrates a set of named feature values.

Next, at step S430, the process determines if there are any sequential n-grams. If there are sequential n-grams, the process continues to step S440, otherwise, the process ends at step S435.

At step S440, the process elects sequential n-grams from the set of n-grams.

Next, at step S445, the process selects the most frequent sequential n-gram from the elected sequential n-grams.

Next, at step S450, the process generates a new sequence of the elements by matching the selected most frequent sequential n-gram against the sequence of elements, replaces matched elements of the sequence of elements with a node, and associates the matched elements of the sequence of elements as children of the node and returns to step S420.

With reference to FIG. 5, illustrated is a flow chart of another method of segmenting a sequence of elements associated with a document, the method including a calibration step and enrichment, as previously described.

At step S500, the process starts.

Then, at step S505, the process receives a sequence of elements representing a document.

Next, at step S510, the process defines a set of named features associated with each element of the sequence of elements.

Next, at step S515, the process computes a set of feature values for each named feature for each element of the sequence.

Next, at step S520, the process calibrates the set of named feature values for each element of the sequence by assigning equal feature values to name.

Next, at step S525, the process generates a set of n-grams from the sequence of elements and calibrates a set of named feature values.

Next, at step S530, the process determines if there are any sequential n-grams. If there are sequential n-grams, the process continues to step S540, otherwise, the process ends at step S535.

At step S540, the process elects sequential n-grams from the set of n-grams.

Next, at step S545, the process selects the most frequent sequential n-gram from the elected sequential n-grams.

Next, at step S550, the process matches the selected most frequent sequential n-gram against the sequence of elements to determine all sub-sequences of n contiguous elements which are matched by the selected n-gram.

Next, at step S555, the process enriches the determined sub-sequences by generating n-grams for each sub-sequence.

Next, at step S560, the process generates a new sequence of elements by replacing each sub-sequence of contiguous matched elements with a node and associating the matched elements of the sequence of elements as children of the node and returns to step S520.

Figure 6:
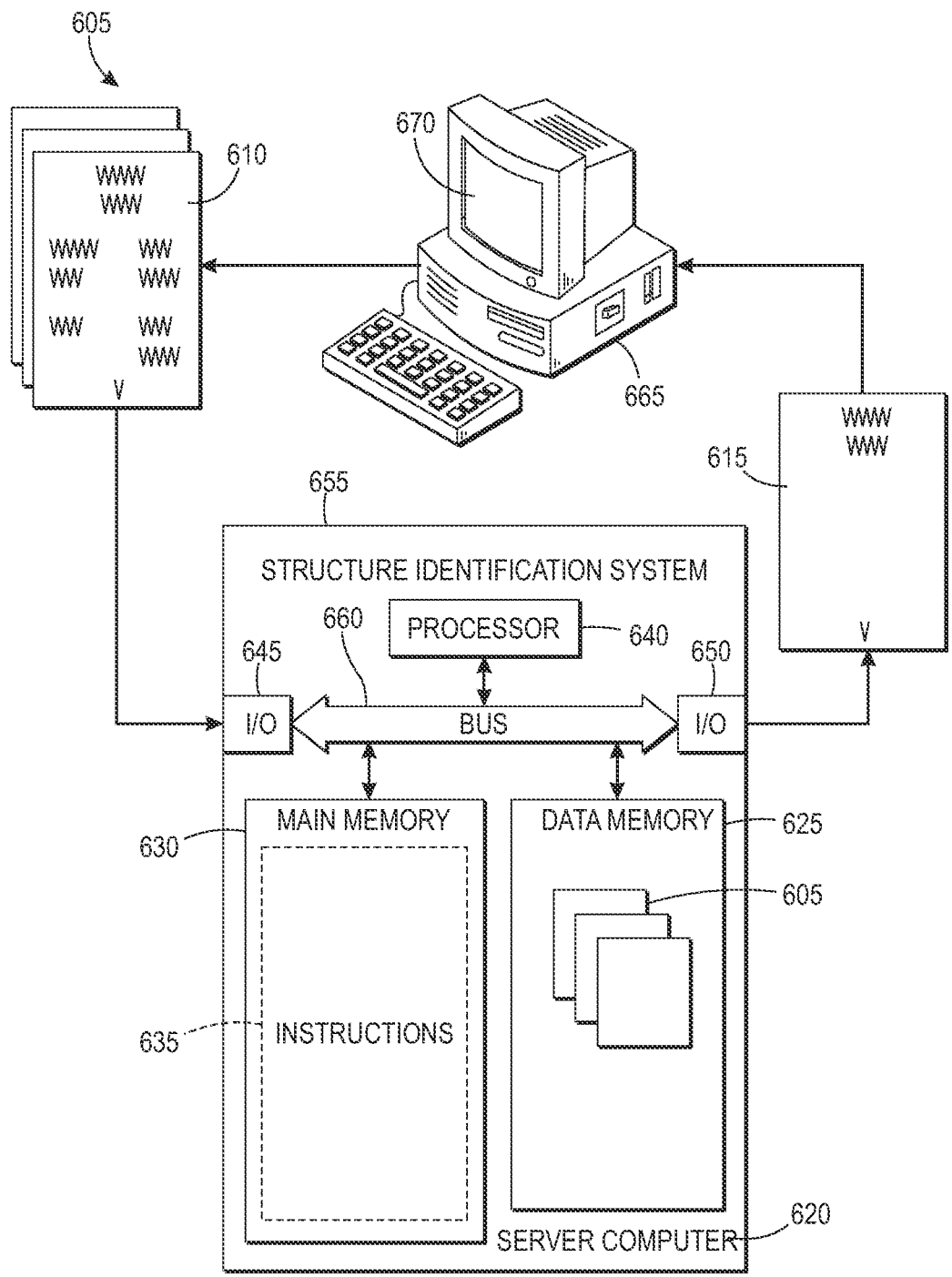
FIG. 6 is a functional black diagram of a document processing system which segments a sequence of elements associated with a digital version of a document according to an exemplary embodiment of this disclosure.

With reference to FIG. 6, illustrated is an exemplary apparatus for generating a document structure associated with a document which may be used for performing the methods previously described. The system takes as input an unstructured document 605 which includes one or more document pages 610. The system outputs information 615 describing the structure(s) which have been identified on the page, the page including a sequence of elements.

The exemplary system may include one or more specific or general purpose computing devices 620. The system receives, as input, an unstructured document 610 and stores the document in data memory 625 during processing. The document is received in electronic form and can be a technical manual, book, journal publication, report, plan, or the like. The exemplary document is in a page description language, such as a PDF, Portable Document Format (Adobe Systems) file, although other unstructured documents are also contemplated, such as PostScript (Adobe Systems), PCL, Printer Command Language (Hewlett-Packard), such as PCL-5, PCL-5E, PCL-6, PCL-XL, TIFF, BMP, Word document, or the like. In PDF, for example, each page of a document is assigned a set of elements, such as text elements and graphical elements, and their respective sizes and locations are identified in a job ticket. The exemplary document includes one or more pages, each of which may be processed independently by the system. The page(s) may each include text, images, or combinations thereof. Images can be photographs, graphics, etc.

Main memory 630 of the apparatus 655 stores instructions 635 for performing the exemplary method. These instructions 635 are implemented by an associated processor 640, such as the computer's CPU. The computer communicates with external devices via one or more input/output devices 645, 650. The hardware components 625, 630, 640, 645, 650 are communicatively linked by a data/control bus 660.

While a collection of documents could be processed, rather than a single document, the exemplary method is also suited to processing documents singly. Prior to inputting, the document pages may be stored in any suitable tangible storage media such as a disk, ROM or RAM, or may be input into the system in the form of a carrier wave, e.g., via the Internet. The input device may include a modem link, a wired or wireless connection, USB port, floppy or hard disk receiver, or the like and may be separated or combined with other components of the system. While the illustrated source of the document is a client computing device 665 (which may be similarly configured to computer 655, except as noted), it will be appreciated, that the document may be input from a scanner, or other digital image capture device, with an associated Optical Character Recognition (OCR) engine for processing the output of the scanner to generate the pages of document, or from a disk, flash drive or other memory storage device.

The system may comprise one or more computing devices 100 such as a personal computer, PDA, laptop computer, server computer, or combination thereof. Memories 625, 630 may be integral or separate and may represent any type of non-transitory computer readable medium such as random access memory (RAM), read only memory (ROM), magnetic disk or tape, optical disk, flash memory, or holographic memory. In one embodiment, the memories comprise a combination of random access memory and read only memory. In some embodiments, the processor and memory may be combined in a single chip.

The digital processor 640 can be variously embodied, such as by a single core processor, a dual core processor (or more generally by a multiple core processor), a digital processor and cooperating math coprocessor, a digital controller, or the like. The digital processor, in addition to controlling the operation of the computer, executes instructions stored in memory for performing the method outlined in FIGS. 3-5, and others discussed herein.

The system may output the information, specifically, document image information, to an external computing device, such as device, or to another output device, such as a display device, such as a screen, or a hardcopy output device, such as a printer, or the like, or to a remote memory storage device. The source/output device may be connected directly with the system or linked thereto, e.g., via a wired or wireless link, such as a local area network or wide area network, such as the Internet. In some embodiments, the information output of the system is stored in memory for further processing, in which content of the document page is labeled or otherwise processed, using the identified structures as input information. The system may generate a graphical user interface (GUI) for display to a user. The exemplary GUI may enable a user to interact with the system via a display screen with a user input device, such as a cursor control device, keyboard, keypad, joystick, touchscreen, or the like. In one exemplary embodiment the display screen 670 is linked to the client computing device and client device includes a web browser which allows the user to interact with the apparatus.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so called "firmware" that is software stored on a ROM or so forth. Such software may be organized in various ways, and may include software components organized as libraries, Internet based programs stored on a remote server or so forth, source code, interpretive code, object code, directly executable code, and so forth. It is contemplated that the software may invoke system level code or calls to other software residing on a server or other location to perform certain functions.

The illustrated instructions for performing the method may be in the form of hardware or a combination of hardware and software. As will be appreciated, the system may include fewer or more components while still having the same functionality. For example, components may be combined to form fewer components, or may be functionally separated to form more individual components. These components are best understood with reference to the exemplary described method, which, in part, is described with reference to FIGS. 1-6.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer implemented method of hierarchically segmenting a sequence of elements associated with a digital version of a document comprising:
   a) obtaining a sequence of elements representing the document;
   b) defining a set of named features associated with each element of the sequence of elements, each named feature defined by a feature value type;
   c) computing a set of feature values associated with the set of named features for each element of the sequence;
   d) generating a set of n-grams from the sequence of elements, an n-gram including an ordered sequence of n features provided by a sequence of n named elements;
   e) electing sequential n-grams from the set of n-grams, the sequential n-grams defined as similar contiguous n-grams;
   f) selecting the most frequent sequential n-gram from the elected sequential n-grams;
   g) generating a new sequence of the elements by matching the selected most frequent sequential n-gram against the sequence of elements associated with the document, replacing matched elements of the sequence of elements with a respective node, and associating the matched elements of the sequence of elements as children of the respective node; and
   h) iteratively repeating steps d)-g) on the new sequence of elements generated in step g) until all sequential n-grams associated with the sequence of elements are matched against the sequence of elements associated with the document, the respective matched elements of the sequence of elements are replaced with a respective node, and the respective matched elements of the sequence of elements are associated as children of the respective node,
   wherein step d) includes:
      d1) calibrating the set of named feature values for each element of the sequence by assigning equal feature values to named features which are fuzzily equal; and
      d2) generating a set of n-grams from the sequence of elements and calibrated set of named feature values, an n-gram including an ordered sequence of n named features provided by a sequence of n elements; and
   wherein step g) includes:
      g1) matching the selected most frequent sequential n-gram against the sequence of elements to determine all sub-sequences of n contiguous element which are matched by the selected n-gram;
      g2) enriching the determined sub-sequences by generating n-grams for each sub-sequence; and
      g3) generating a new sequence of elements by replacing each sub-sequence of contiguous matched elements with a respective node and associating the matched elements of the sequence of elements as children of the respective node.

2. The computer implemented method according to claim 1, wherein steps d)-g) are iteratively repeated for the new sequence of the elements as long as step f) can select a most frequent sequential n-gram from the elected sequential n-grams.

3. The computer implemented method according to claim 1, wherein fuzzily equal named feature values are associated with feature values which are within a pre-determined range of value differences and a most frequent feature value is considered a canonical feature value for the named features which are fuzzily equal.

4. The computer implemented method according to claim 1, wherein the sequence of elements is associated with one or more of pages, lines, blocks, words, columns, rows.

5. The computer implemented method according to claim 1, wherein the feature types are one or more of numerical, text, position, zone and REGEX (regular expression).

6. The computer implemented method according to claim 1, wherein the set of n-grams are generated from the sequence of elements where n varies in [1, N] and N is configurable.

7. The computer implemented method according to claim 1, wherein the method produces a final data structure representing a tree structure including one or more levels including one or more nodes.

8. The computer implemented method according to claim 1, further comprising:

detecting key features of the document based on a final generated sequence of elements.

9. An image processing system comprising:
a controller configured to receive a digital version of a document, the controller configured to execute instructions to perform a method of hierarchically segmenting a sequence of elements associated with the digital version of the document comprising:
a) obtaining a sequence of elements representing the document;
b) defining a set of named features associated with each element of the sequence of elements, each named feature defined by a feature value type;
c) computing a set of feature values associated with the set of named features for each element of the sequence;
d) generating a set of n-grams from the sequence of elements, an n-gram including an ordered sequence of n features provided by a sequence of n named elements;
e) electing sequential n-grams from the set of n-grams, the sequential n-grams defined as similar contiguous n-grams;
f) selecting the most frequent sequential n-gram from the elected sequential n-grams;
g) generating a new sequence of the elements by matching the selected most frequent sequential n-gram against the sequence of elements associated with the document, replacing matched elements of the sequence of elements with a respective node, and associating the matched elements of the sequence of elements as children of the respective node; and
h) iteratively repeating steps d)-g) on the new sequence of elements generated in step g) until all sequential n-grams associated with the sequence of elements are matched against the sequence of elements associated with the document, the respective matched elements of the sequence of elements are replaced with a respective node, and the respective matched elements of the sequence of elements are associated as children of the respective node,
wherein step d) includes:
  d1) calibrating the set of named feature values for each element of the sequence by assigning equal feature values to named features which are fuzzily equal; and
  d2) generating a set of n-grams from the sequence of elements and calibrated set of named feature values, an n-gram including an ordered sequence of n named features provided by a sequence of n elements; and
wherein step g) includes:
  g1) matching the selected most frequent sequential n-gram against the sequence of elements to determine all sub-sequences of n contiguous element which are matched by the selected n-gram;
  g2) enriching the determined sub-sequences by generating n-grams for each sub-sequence; and
  g3) generating a new sequence of elements by replacing each sub-sequence of contiguous matched elements with a respective node and associating the matched elements of the sequence of elements as children of the respective node.

10. The image processing system according to claim 9, wherein the sequence of elements is associated with one or more of pages, lines, blocks, words, columns, rows.

* * * * *